United States Patent [19]
Davis et al.

[11] 3,770,131
[45] Nov. 6, 1973

[54] FEEDWELL

[75] Inventors: Stevens S. Davis, Bountiful; Spencer D. Cottam, Salt Lake City, both of Utah

[73] Assignee: Envirotech Corporation, Salt Lake City, Utah

[22] Filed: Oct. 20, 1971

[21] Appl. No.: 190,733

[52] U.S. Cl. .................... 210/519, 210/532
[51] Int. Cl. .......................... B01d 21/00
[58] Field of Search .............. 210/519, 520, 521, 210/523, 532, 522, 83

[56] References Cited
UNITED STATES PATENTS

| | | | |
|---|---|---|---|
| 2,678,730 | 5/1954 | Coulter | 210/520 X |
| 2,497,392 | 2/1950 | Breukel | 210/521 |
| 3,399,135 | 8/1968 | Conley, Jr. et al. | 210/521 X |
| 3,486,628 | 12/1969 | Darby | 210/520 |
| 2,796,175 | 6/1957 | Cover | 210/522 |

Primary Examiner—Samih N. Zaharna
Assistant Examiner—T. A. Granger
Attorney—Robert E. Krebs et al.

[57] ABSTRACT

A tubular feedwell is centrally located in a sedimentation pool and the feedwell wall is provided with a plurality of elongated passages through which influent passes from the interior of the feedwell into the surrounding sedimentation pool.

9 Claims, 6 Drawing Figures

PATENTED NOV 6 1973
3,770,131
SHEET 1 OF 3
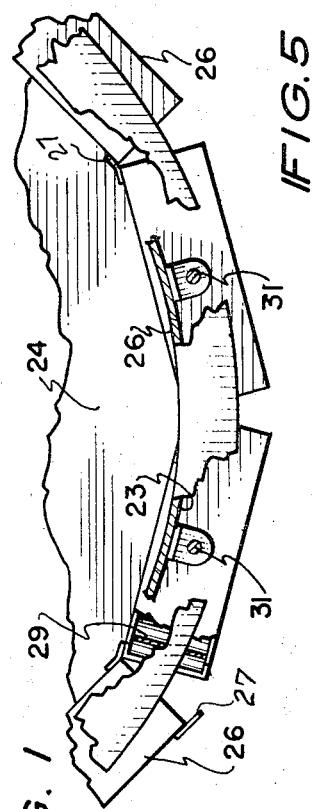
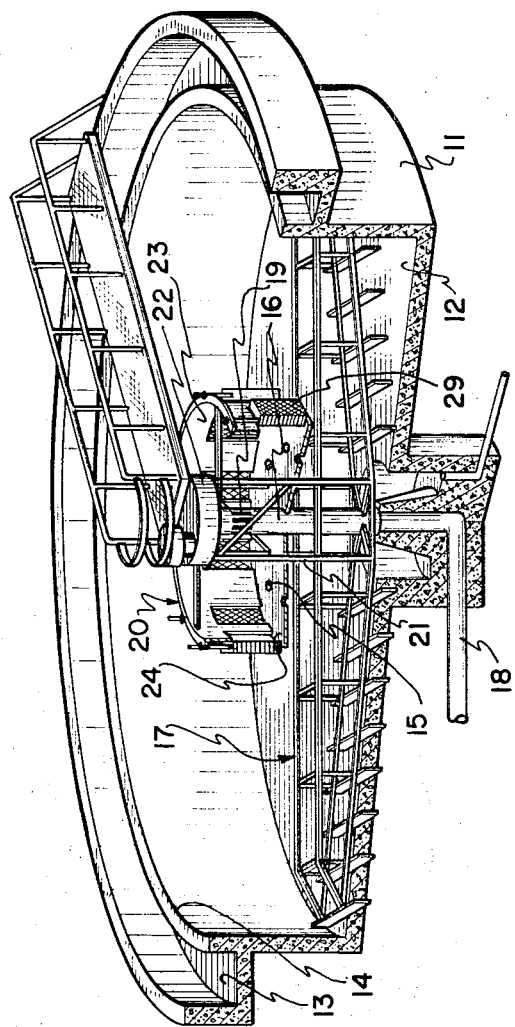
INVENTOR.
STEVEN S. DAVIS
BY SPENCER D. COTTAM
Robert Krebs
THEIR ATTORNEY

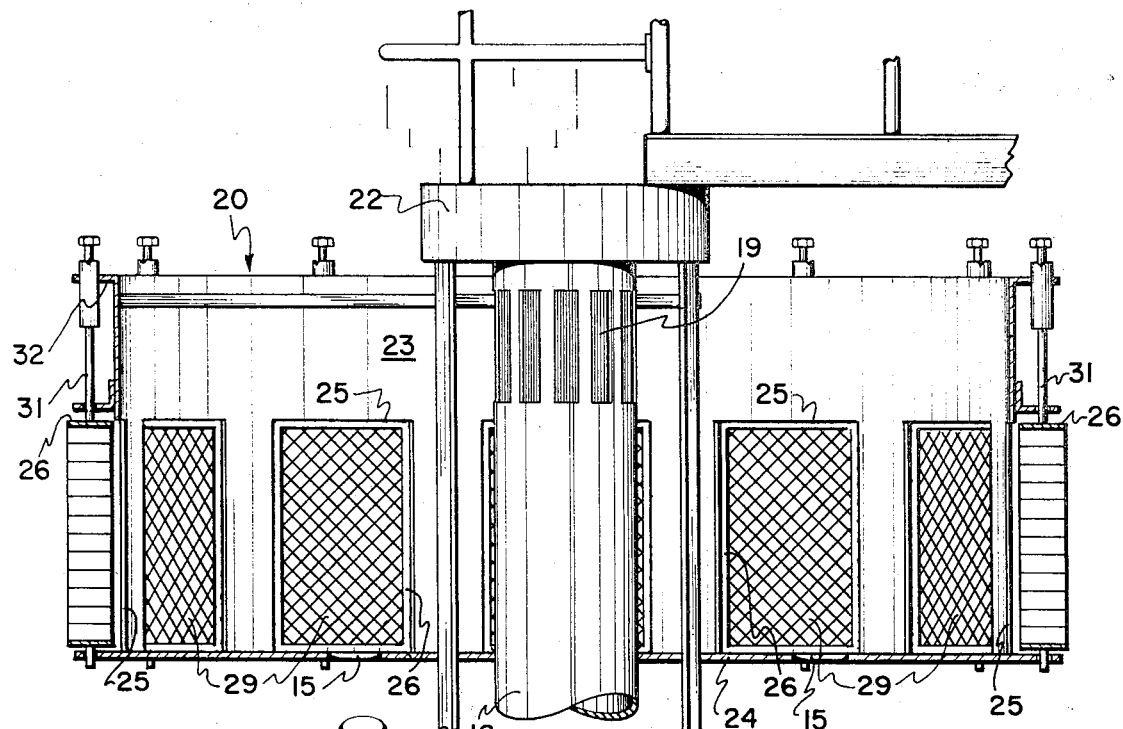
FIG. 2
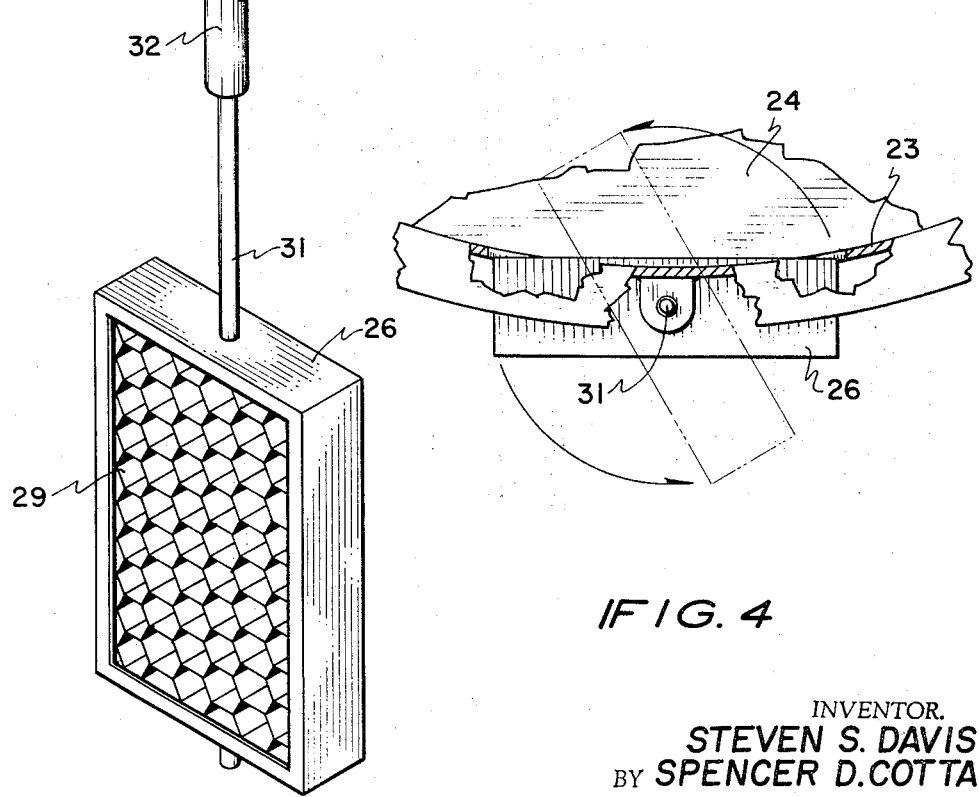
FIG. 3
FIG. 4
INVENTOR.
STEVEN S. DAVIS
BY SPENCER D. COTTAM
Robert Krebs
THEIR ATTORNEY

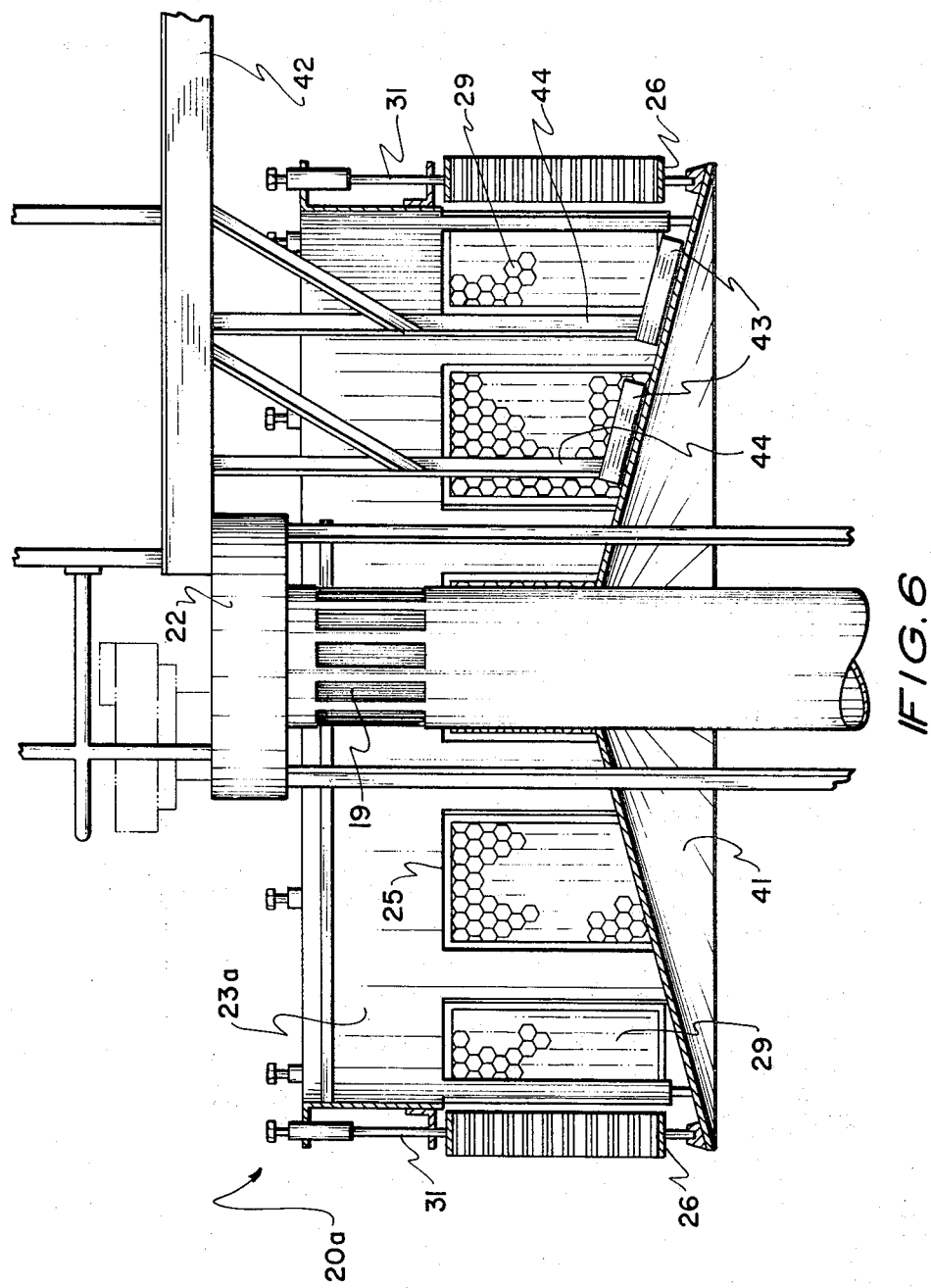

FEEDWELL

BACKGROUND OF THE INVENTION

The present invention relates to sedimentation apparatus and, more particularly, to feedwell for receiving feed supplied thereto.

Sedimentation equipment has various applications including water purification, sewage treatment and liquid waste clarification. In the usual sedimentation system, solids suspended in a continuous supply of liquid are fed into a pool in a tank where the solids are settled out and collected on the bottom of the tank for subsequent removal therefrom while clarified effluent is continuously discharged.

In many arrangements, a feed source connects through a conduit beneath the tank to a hollow, upstanding pier which is centrally located in the tank; the feed flows upwardly through the pier to outlets therein near the surface of the pool. Usually, a feedwell is mounted about the pier's outlets to kill influent energy and to provide substantial diffusion of feed throughout the pool. Feed should not be allowed to plunge from the feedwell nor should short circuiting streams be allowed to form whereby material reaches the discharge outlet of the pool without sedimentation having been completed.

At any given feed rate the efficiency of sedimentation is a direct function of average detention time per unit volume and the degree of quiesence in the sedimentation pool. The classic approach to uniform detention and maximum quiesence at a given feed rate is to employ the so-called energy dissipating feedwells which seek first to dissipate the kinetic energy of the incoming feed by passage of the feed through various devices and then to distribute the flow uniformly in all directions. For instance, prior feedwells have included internal energy dissipating baffles. In other cases the feedwell walls have been formed from spaced-apart, vertically extending members in the so-called "picket fence" arrangement.

OBJECTS OF THE INVENTION

The primary object of this invention is to provide means for introducing and diffusing feed into a sedimentation pool to achieve substantially equal detention time for all units of feed in the pool while maintaining therein maximum quiesence.

An important object of this invention is to provide means for uniformly distributing influent volume into and throughout a sedimentation pool over a substantial vertical extent of submergence in the pool;

Another object is to provide a feedwell which introduces influent into a sedimentation pool in substantially laminar, non-turbulent, radial flow;

Still another object is to provide a feedwell adapted to accommodate varying feed rates with minimal change in effluent quality; and A further object is to provide a feedwell with flow-directing means which are conveniently cleanable.

BRIEF DESCRIPTION OF THE DRAWINGS

Further objects of the invention may be readily ascertained by the following description and appended illustrations, in which:

FIG. 1 is a perspective view, partially cut-away, of sedimentation apparatus embodying the invention;

FIG. 2 is an enlarged elevation, partially cut away, of the feedwell structure of the apparatus shown in FIG. 1, some parts being shown in broken lines;

FIG. 3 is an enlarged perspective view of a portion of the feedwell structure shown in FIG. 2;

FIG. 4 is a fragmentary plan view of a portion of the feedwell structure shown in FIG. 2;

FIG. 5 is a view taken in the same position as FIG. 4 showing alternative structure; and FIG. 6 is an enlarged elevation, partially cut away, of a modified form of feedwell embodying the invention.

DETAILED DESCRIPTION

As shown in FIG. 1, sedimentation apparatus generally includes a tank defined by marginal upstanding side walls 11 and a bottom 12, a peripheral launder 13 equipped with an overflow weir 14, a centrally positioned hollow pier 16 rising from the bottom of the tank, and a rotary rake structure generally designated as 17. The rake structure 17 is supported on a cage 21 which is rotatably driven by drive 22. The rake structure is positioned to move over the tank bottom to convey settled solids to discharge. Incoming feed, as supplied through an underground conduit 18, rises through the pier 16 to inlet ports 19 adjacent the upper end thereof, thence flows into a feedwell 20 whence it enters the surrounding pool.

The feedwell is tubular and comprises (FIGS. 2–4) a wall 23 which is supported to encircle the upper portion of the pier 16. The wall may be conveniently supported by and be rotatable with the cage 21; obviously other support arrangement may be provided. The feedwell extends downwardly from an elevation slightly above the normal liquid level of the sedimentation pool (as determined by the overflow weir 14) to terminate at an elevation substantially below the inlet ports 19 in the pier. In the embodiment illustrated in FIGS. 2–4, the feedwell is provided with a flat bottom 24 which closely fits around the pier and which may partially support the feedwell.

A plurality of enlarged openings 25 are formed in the lower portion of the wall 23 and are spaced therearound at generally equal intervals. A frame 26 is hung from the feedwell to fit over each of the openings and flexible flaps (shown only in FIG. 5) may be provided so that the frames are somewhat sealed in the openings. It is obvious that the openings may be so sized that the lower portion of the wall is essentially, or even totally, as in FIG. 5, comprised of side-by-side frames. A set of a plurality of elongated flow directing conduits 29 is mounted in each frame. Then the total flow of influent from the feedwell to the pool will be by diffusion through a large number of flow directing conduits as contrasted to high velocity flow through a small number of enlarged ports as sometimes employed in prior structures. In this connection, it is important that the total cross sectional area of the conduits be relatively large to effect such diffusion. Some of the kinetic energy of the feed stream is dissipated by positioning the conduits below the ports 19 of the pier 16 so that several changes in direction occur before the stream reaches the conduits.

When the feed is of such a nature that significant sedimentation occurs even in the feedwell, as in thickening or primary clarification, louvers or apertures 15 may be provided in the bottom 24 to allow the particles to settle directly into the pool proper. Other forms of outlets as well as means for raking solids to such outlets may be provided as more particularly shown in FIG. 6. Thus, in applications where the feed contains heavier or more rapidly settleable solids, the feedwell (20a in FIG. 6) may be provided with a bottom 41 which slopes downwardly away from the pier to terminate in spaced reltationship to the feedwell wall 23a to define an annular slot providing communication between the feedwell and surrounding pool. Or, the bottom may slope downward toward the pier and an annular slot formed concentric about the pier. A rake blade 43 which sweeps the feedwell bottom is supported from the walkway 42 by suitable fixed arms 44 and is arranged to move accumulated solids toward the slot as the feedwell rotates relative to the rake. The size of the slot is selected to offer sufficient resistance to flow to create a back pressure which causes most of the feed to exit from the feedwell through the elongated conduits 29 in the feedwell wall.

The frames 26 may be hung by arms 31 which extend downwardly from brackets 32 mounted on the wall. Usually the frames are positioned so that the conduits are substantially radially directed. For cleaning or flushing of deposited solids, the frame may be rotated 180° and again fixed in the bracket 32. It is obvious that other latch means may be included to fix the frames individually in other directions to, for instance, induce sprial flow in the tank or to impinge outflows from adjacent frames against each other. Means may also be included to adjustably tilt the frames from the vertical.

In FIG. 3 the elongated conduits 29 are arranged in a honeycomb-like pattern within the frame, and all conduits in each frame are of uniform cross section, and are horizontally disposed and parallel to each other. According to the invention, other patterns of these small conduits, such as a corrugated arrangement, may be utilized.

One example of an effective arrangement designed for use in a secondary clarifier consists of hexagonal conduits which are about 1 inch in height, 1½ inches in width and which extend axially about 9 inches. In that arrangement, a set consisted of a plurality of such conduits were nested together to fill a frame about 3 feet high, 2½ feet long and about 9 inches deep; 12 of the frames were fitted about a feedwell which was about 5 feet deep and about 12 feet in diameter. Generally, a length to diameter ratio for each of the conduits of approximately 6.5 is suggested for secondary treatment operations and a suggested maximum velocity of flow through each of the conduits is 0.2 feet per second in a secondary clarifier having a flow of roughly 800 gallons per day per square foot. If the set of conduits is self-supporting, a frame is not necessary, and the arm 31 may be attached directly to the set of conduits. Generally, not less than four sets of conduits are utilized per feedwell and an alternate construction within the broad scope of the invention would comprise a feedwell in which the wall is entirely formed from radially directed elongated conduits so that diffusion occurs through the entire wall.

The conduit geometry (e.g., diameter, length, surface texture) should provide a sufficient resistance to flow to produce a slight differential head with the fluid pressure in the feedwell above that in the pool proper. The positive hydraulic head differential between the feedwell and surrounding pool causes circumferentially uniform diffusion of influent streams from the feedwell into the pool with all of the streams having generally uniform velocity. Normally, the velocity of the fluid entering the feedwell is low (i.e., in the laminar range). The geometry chosen for the conduits should be such that the associated Reynolds number is in the range of laminar flow. That is, it is desirable to have substantially laminar flow directed from the feedwell into the pool proper. It is important that the length of the conduits be sufficient to establish a definite direction and stability to the streams exiting from the feedwell. That is, the streams are stabilized in a direction of flow and, except for diffusion into a greater volume, or unless acted upon by other forces, will tend to continue in that direction, or, stated still another way, the conduits are flow straighteners. It has been found preferable to have the adjacent streams of the outflow directed substantially horizontal in the typical operation.

Clarifiers using a feedwell constructed according to the invention have consistently yielded an effluent with a substantially stable suspended solids content even though the feed rate varied over a wide range. Thus, a sedimentation unit equipped with the feedwell accommodates a fluctuating feed supply to yield a stable product which is highly desirable in treatment plants which experience periodic overloading or have limitations on sedimentation pool size. In the latter connection it will be appreciated that the feedwell of the invention increases the efficiency of the sedimentation unit in which it is employed thus enabling use of a smaller sedimentation tank for given feed rates and feed content.

I claim:

1. In a sedimentation device which includes an open tank defined by a bottom and marginal sidewalls for containing a sedimentation pool, influent means for delivering liquid feed centrally into the tank, sediment discharge means adjacent the bottom for discharging settled material therefrom, and effluent discharge means located at the periphery of said tank, an improved feedwell comprising:

a. a wall which is mounted generally centrally within the tank and which defines an enclosed space for receiving liquid feed from said influent means, said wall having generally regularly spaced-apart openings formed therethrough, a bottom closure member connected to the lower edge of side wall;

b. conduit banks comprising a multipicity of straight conduits which are relatively short relative to the radius of the tank, arranged side by side and mounted in each of said openings with said conduits directed generally radially outwards relative to the tank to provide liquid flow communication between the interior of the feedwell and the interior of said tank and to convey the influent liquid into the tank in a generally radially uniform flow; and c. a solids discharge outlet in said bottom closure member of said feedwell.

2. The feedwell according to claim 1 wherein said solids discharge outlet comprises apertures formed through said bottom closure member so that feed solids which settle within the feedwell are discharged downward therefrom.

3. The feedwell according to claim 2 including rake means to urge solids toward said apertures in said bottom closure member.

4. The feedwell according to claim 1 wherein said bottom closure member is sloped from its center downwardly, and a generally peripheral gap is formed between the peripheral edge of said bottom closure member and the lower edge of said wall.

5. The feedwell according to claim 4 in which the total open area of said gap is less than the total open cross sectional area of said conduits.

6. The feedwell according to claim 5 including rake means to urge solids toward said gap.

7. The feedwell according to claim 1 wherein said conduits have a length to diameter ratio of at least 6.5 to 1.

8. The feedwell according to claim 1 including individual frames over said openings, said frames supporting said multiplicity of conduits so that said conduits are mounted in fluid flow relationship over said openings in said wall.

9. The feedwell according to claim 8 including mounting means to enable selective rotation of said individual frames to reverse the direction of the flow of liquid through said conduits.

* * * * *